(12) United States Patent
Tanaka

(10) Patent No.: US 7,650,921 B2
(45) Date of Patent: Jan. 26, 2010

(54) RUN-FLAT TIRE WITH SIDE REINFORCING CORD LAYER

(75) Inventor: Masatoshi Tanaka, Kobe (JP)

(73) Assignee: Sumitomo Rubber Industries, Ltd., Kobe-shi (JP)

(*) Notice: Subject to any disclaimer, the term of this patent is extended or adjusted under 35 U.S.C. 154(b) by 256 days.

(21) Appl. No.: 11/360,684

(22) Filed: Feb. 24, 2006

(65) Prior Publication Data
US 2006/0201599 A1    Sep. 14, 2006

(30) Foreign Application Priority Data
Mar. 10, 2005    (JP)  .............................. 2005-067700

(51) Int. Cl.
B60C 17/00    (2006.01)
B60C 13/00    (2006.01)
B60C 15/00    (2006.01)

(52) U.S. Cl. ........................ 152/517; 152/554; 152/555

(58) Field of Classification Search ................. 152/517, 152/555, 554
See application file for complete search history.

(56) References Cited

U.S. PATENT DOCUMENTS

| 4,263,955 A | * | 4/1981 | Ikeda ........................ 152/517 |
| 5,217,549 A | * | 6/1993 | Johnson ..................... 152/517 |
| 6,630,241 B1 | * | 10/2003 | Nishikawa et al. |
| 7,201,196 B2 | * | 4/2007 | Suzuki ....................... 152/517 |

FOREIGN PATENT DOCUMENTS

| EP | 1 577 122 A1 | * | 9/2005 |
| JP | 11227424 A | * | 8/1999 |
| JP | 2001071714 A | * | 3/2001 |
| JP | 2002-301914 A | | 10/2002 |

* cited by examiner

Primary Examiner—Adrienne C Johnstone
(74) Attorney, Agent, or Firm—Birch, Stewart, Kolasch & Birch LLP

(57) ABSTRACT

A run-flat tire is provided at its side wall with a side reinforcing rubber layer having a substantially falcate cross section, and a side reinforcing cord layers extending inside and outside along a ply body of a carcass in a radial direction. A radially outer end of the side reinforcing cord layer is sandwiched and terminated between a belt layer and a ply body of the carcass. A radial inner end of the side reinforcing cord layer is terminated in the vicinity of the bead core.

10 Claims, 10 Drawing Sheets

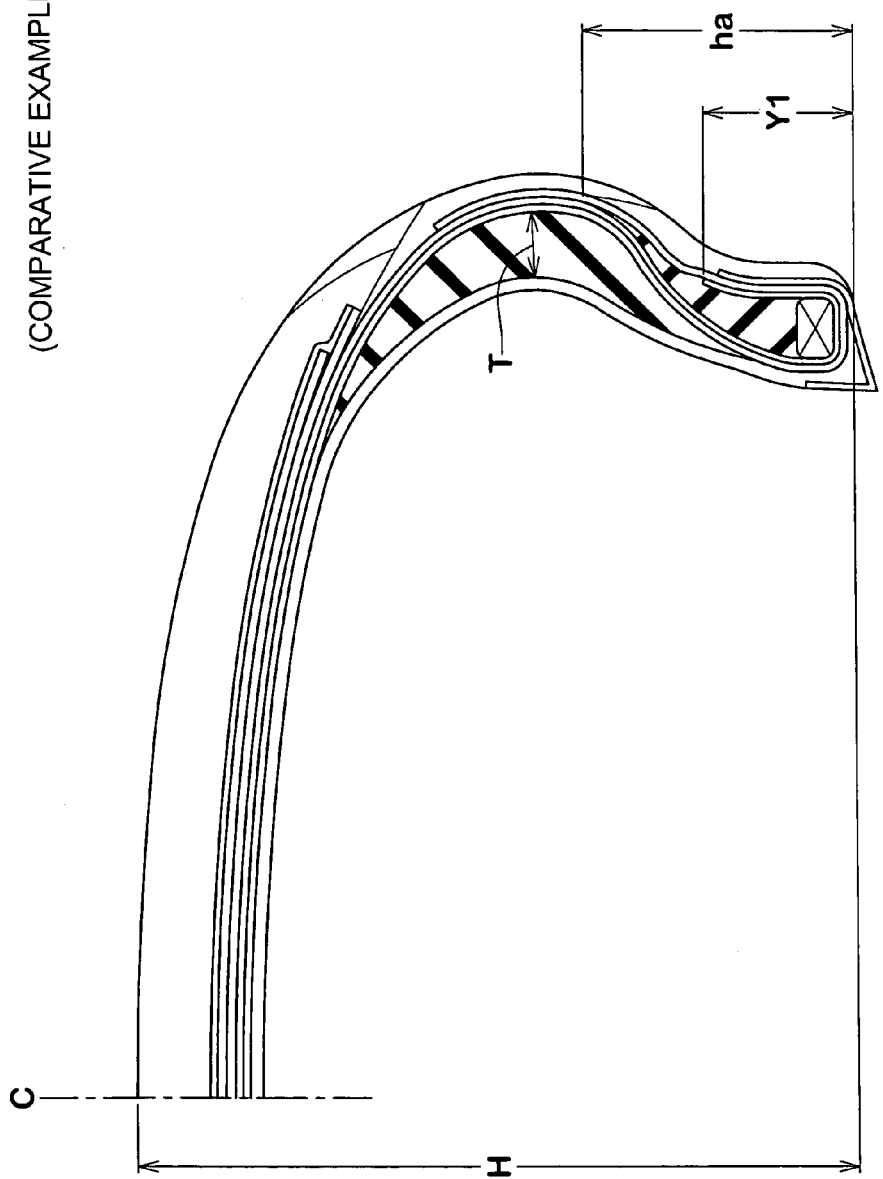
FIG.8 (COMPARATIVE EXAMPLE 3)

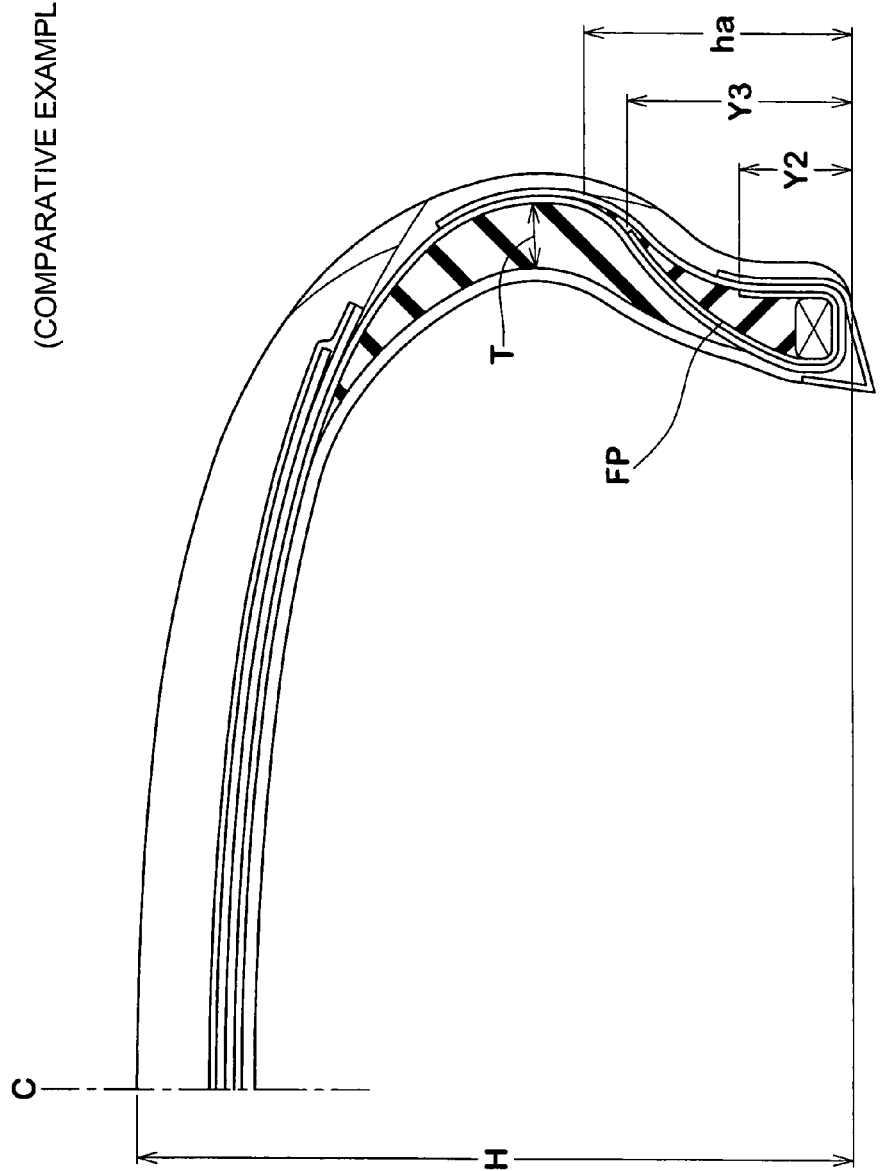
FIG.9 (COMPARATIVE EXAMPLE 4)

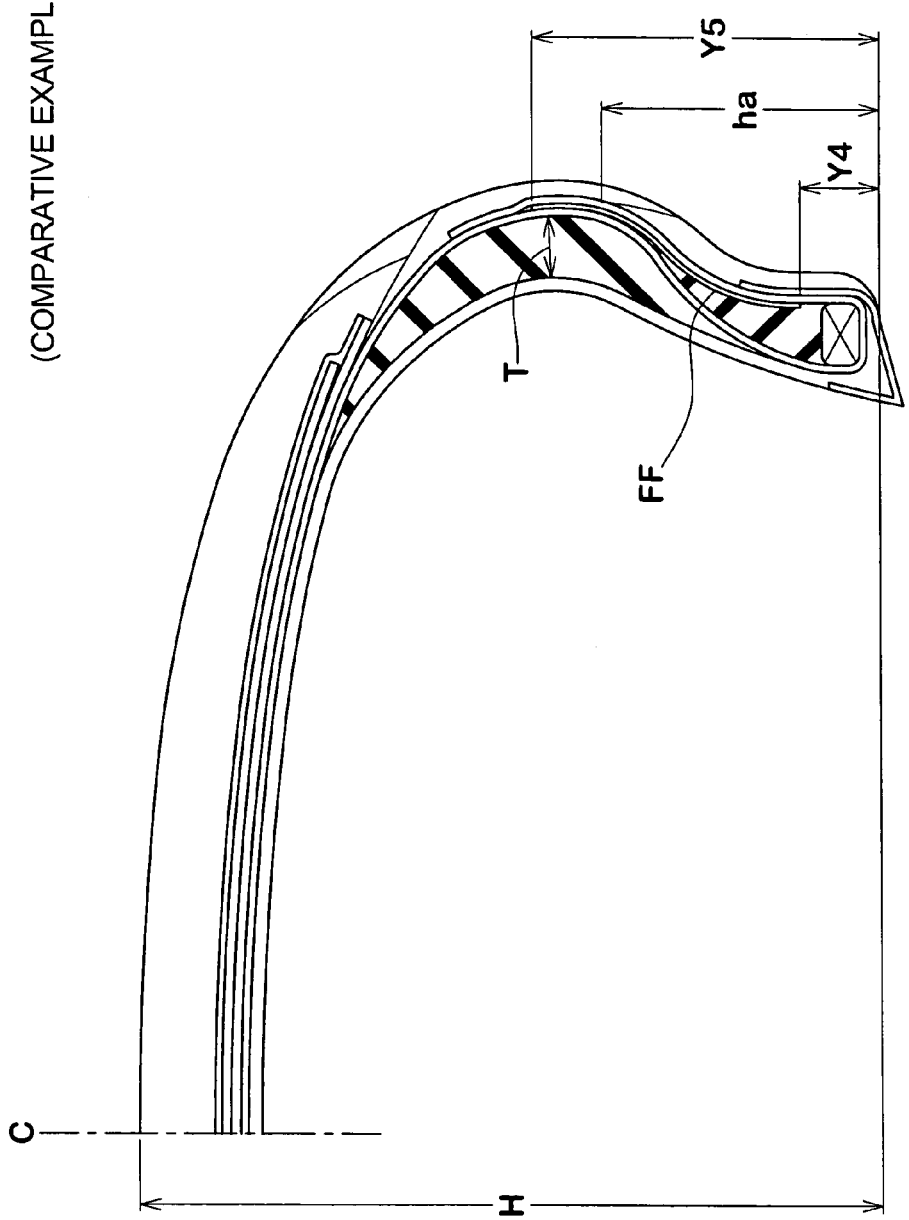
FIG.10 (COMPARATIVE EXAMPLE 5)

RUN-FLAT TIRE WITH SIDE REINFORCING CORD LAYER

BACKGROUND OF THE INVENTION

1. Field of the Invention

The present invention relates to a run-flat tire capable of continuously running even when tire puncture occurs.

2. Description of the Related Art

As shown in Japanese Patent Application Laid-open No. 2002-301914 for example, there is a known run-flat tire provided at its sidewall portion with a side reinforcing rubber layer having high load-supporting ability and having substantially falcate cross section. This run-flat tire can continuously run by about 100 km by suppressing a deflection amount of the sidewall portion when tire puncture occurs.

However, although the tire is a run-flat tire, if a running distance in the blowout state is increased, the sidewall portion is gradually heated due to periodical bending deformation and inside rubber material and cord material are thermally destroyed. If the run-flat tire is further continuously allowed to run, the sidewall portion is heated to about 200° C., the tire completely loses the load-supporting ability and can not run any more. In order to increase the run-flat running distance, it is important to reduce the deflection of the sidewall portion and to suppress the heat.

According to the conventional run-flat tire, a large side reinforcing rubber layer is used to suppress the deflection of the sidewall portion. However, such a tire has great weight and this deteriorates fuel economy. Further, since the rubber thickness of the sidewall portion is increased, heat storing degree is high, and sufficient improving effect can not be obtained.

SUMMARY OF THE INVENTION

Based on an idea that a side reinforcing cord layer having a reinforcing cord is disposed in a sidewall portion, and positions of an outer end and an inner end of the side reinforcing cord layer in the radial direction of the tire are appropriately defined, it is a main object of the present invention to provide a run-flat tire capable of increasing the run-flat running distance while suppressing the increase in weight of the tire to the minimum level.

In one aspect of the invention, a run-flat tire is provided with:

a carcass including at least one carcass ply having a ply body extending from a tread portion to a bead core of a bead portion through a sidewall portion, and a ply folded-back portion which is connected to the ply body and which is folded back from inside toward outside around the bead core in an axial direction of the tire;

a belt layer disposed outside of the carcass in a radial direction of the tire and inside of the tread portion;

a side reinforcing rubber layer which is disposed in the sidewall portion and which has a substantially falcate cross section; and a side reinforcing cord layer comprising at least one reinforcing cord ply disposed in the sidewall portion, wherein the side reinforcing cord layer extends in the radial direction along the ply body, an outer end of the side reinforcing cord layer in the radial direction is sandwiched and terminated between the ply body and the belt layer, an inner end of the side reinforcing cord layer in the radial direction is terminated in the vicinity of the bead core.

According to the run-flat tire of the invention, the sidewall portion includes the side reinforcing cord layer. The side reinforcing cord layer extends along the ply body of the carcass, and its outer end in the radial direction is sandwiched and terminated between the ply body and the belt layer, and its inner end in the radial direction is terminated in the vicinity of the bead core. According to such a side reinforcing cord layer, it is possible to suppress the increase in weight of the tire to the minimum level, to reinforce the sidewall portion, and to increase the run-flat running distance. Since the side reinforcing cord layer suppresses the increase in thickness of the sidewall portion to the minimum level, it is possible to suppress the temperature rise of the sidewall portion caused by heat storage, and to further increase the run-flat running distance.

BRIEF DESCRIPTION OF THE DRAWINGS

FIG. 8 is a sectional view of a run-flat tire of comparative example 3;

FIG. 9 is a sectional view of a run-flat tire of comparative example 4; and

FIG. 10 is a sectional view of a run-flat tire of comparative example 5.

DESCRIPTION OF THE PREFERRED EMBODIMENTS

Figure 1:
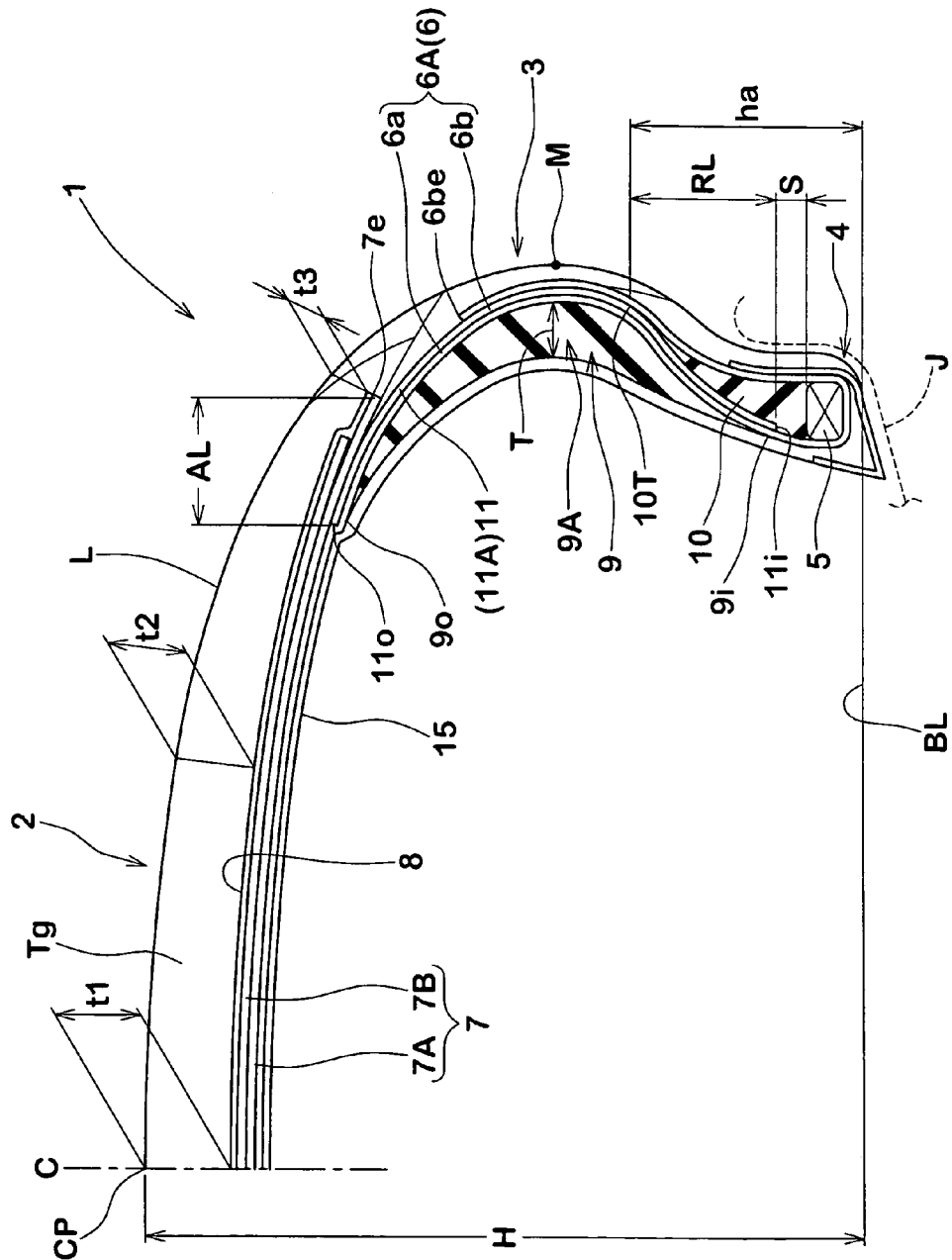
FIG. 1 is a sectional view of a run-flat tire showing an embodiment of the present invention.

An embodiment of the present invention will be explained based on the drawings. FIG. 1 is a right half sectional view of a run-flat tire 1 according to the embodiment.

As shown in FIG. 1, a run-flat tire 1 includes a carcass 6 extending from a tread portion 2 to a bead core 5 of a bead portion 4 through a sidewall portion 3, a belt layer 7 disposed outside of the carcass 6 in the radial direction and inside of the tread portion 2, and a side reinforcing rubber layer 9 which is disposed in the sidewall portion 3 and which has a substantially falcate cross section. In this embodiment, the run-flat tire 1 is for a passenger vehicle.

As a tire for the passenger vehicle, it is preferable that the aspect ratio is as low as 20 to 65% for example. In such a tire having the low aspect ratio, since the sidewall portion 3 is low, the rigidity of the side portion is high and this is suitable for the run-flat tire. In the tire 1, an inner liner rubber 15 made of rubber through which air can not easily pass is disposed on its cavity surface. When the tire is not punctured, the inner pressure is maintained by the inner liner rubber 15.

The carcass 6 is made of one or more (one, in this embodiment) carcass ply 6A in which a carcass cord is coated with topping rubber. Preferable examples of materials of the carcass cords are organic fibers such as nylon, polyester, rayon, and aromatic polyamide, and polyester is used in this embodiment. The carcass cords are arranged at an angle of 75 to 90° with respect to the circumferential direction of the tire.

The carcass ply 6A includes a ply body 6a lying astride between the bead cores 5 and 5, and a ply folded-back portion 6b which is connected to both ends of the ply body 6a and folded back from inside to outside around the bead core 5 in the axial direction of the tire. This embodiment has a so-called high turn up structure (HTU) in which an outer end 6be of the ply folded-back portion 6b in the radial direction is located on outer side from a flange outer end of a normal rim J in the radial direction of the tire, more preferably, on outer side from the widest position M of the tire in the radial direction of the tire. Such a high turn up structure can effectively reinforce the sidewall portion 3 with a small number of plies. To reduce the weight of the tire, it is possible to employ a so-called low turn up structure (LTU) in which the outer end 6be of the ply folded-back portion 6b is located on inner side from the flange outer end of the normal rim J in the radial direction. The carcass 6 may comprise a plurality of carcass plies.

A bead apex rubber 10 is disposed between the ply body 6a and the ply folded-back portion 6b, so as to extend in a tapered manner outward in the radial direction of the tire from an outer surface of the bead core 5 in the radial direction. The bead apex rubber 10 is preferably made of hard rubber having rubber hardness (durometer A hardness) of 65 to 95°, preferably 70 to 95°. The bead apex rubber 10 is of help to enhance the bending rigidity of the bead portion 4 and to suppress the vertical deflection of the tire 1.

A height ha of the outer end of the bead apex rubber 10 in the radial direction from a bead base line BL is not especially limited, but if the height is excessively small, durability at the time of run-flat running is prone to be deteriorated, and if the height is excessively high, the weight of the tire is excessively increased and riding comfort is largely deteriorated. From this point of view, it is preferable that the height ha of the bead apex rubber 10 is 10 to 45% of a height H of cross section of the tire, and more preferably 25 to 40% thereof.

The belt layer 7 is made of two or more (two in this embodiment) belt plies 7A and 7B in which in which belt cords are arranged at an angle of 10 to 35° with respect to the circumferential direction of the tire and are coated with topping rubber. In the belt plies 7A and 7B, the belt cords intersect with plies, the carcass 6 is strongly fastened, and rigidity of the tread portion 2 is enhanced. In this embodiment, the belt ply 7A located on the inner side in the radial direction is wider than the belt ply 7B located on the outer side. With this, the outer end of the belt ply 7A on the inner side constitutes an outer end 7e of the belt layer 7. Preferably, a steel cord is suitable as the belt cord, but it is also possible to employ organic fiber cord having high elasticity such as aramid and rayon.

In this embodiment, a band layer 8 is disposed outside of the belt layer 7 in the radial direction of the tire. The band layer 8 comprises at least a band ply in which organic fiber cords are arranged at an angle of 10° or less with respect to the circumferential direction of the tire. As the band play, it is possible to employ a Pointless band in which a band cord is wound spirally and a band ply in which a band-like ply is wound once.

A tread rubber Tg is disposed in the tread portion 2. As a preferable mode, a profile shape of a ground-contact surface of the tread rubber Tg has a tread curve L in which a radius of curvature is continuously or stepwisely reduced outward in the axial direction of the tire from a tire equator C. Such a tread curve L rounds a surface of the tread portion 2, and reduces the sidewall region. Thus, the tread curve L is of help to enhance the rigidity of the side portion of the tire 1.

Figure 2:
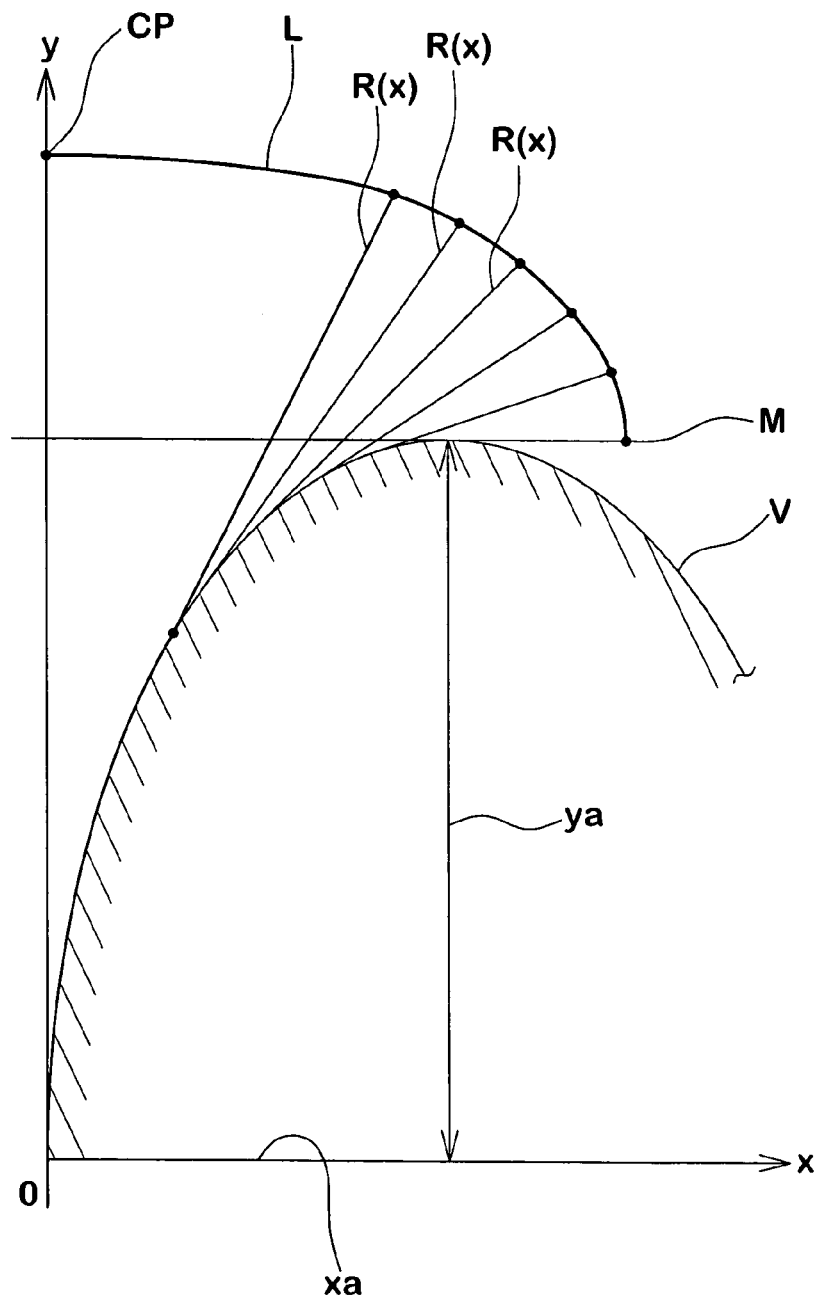
FIG. 2 is a diagram for explaining one example of a tread curve.

An involute curve is preferable as the tread curve L. FIG. 2 shows one example of the involute curve. FIG. 2 shows an x-y coordinate system in which a vertical axis is a y-axis extending along a radial direction of the tire, and a horizontal axis is an x-axis extending along the axial direction of the tire. Here, an ellipse V having a long axis ya is defined. A short axis xa of the ellipse V is located on the x-axis, and one end of the short axis xa matches with the origin O. The involute curve can be expressed by a locus depicted by a tip end of a thread which connects the origin O and an intersection CP between the tire equator C and the tread surface when the thread is fixed to the origin and wound around the ellipse V in this state. Such a tread curve L has a radius of curvature $R(x)$ which is continuously reduced as a function of x. The tread curve L forms all or a portion between the intersection CP and the widest position M of the tire of the sidewall portion 3.

The tread curve L shows a profile shape of the ground-contact surface of the tread rubber Tg in a normal state in which the tire 1 is assembled to a normal rim J and normal internal pressure is charged and no load is applied. Here, the "normal rim" is a rim determined for each tire by a standard including one on which the tire is based, and the normal rim is a standard rim in the case of JATMA, a "Design Rim" in the case of TRA, and a "Measuring Rim" in the case of ETRTO. Further, "normal internal pressure" means an air pressure determined for each tire by a standard. The "normal internal pressure" is a maximum air pressure in JATMA, a maximum value described in "TIRE LOAD LIMITS AT VARIOUS COLD INFLATION PRESSURES" in the case of TRA, and "INFLATION PRESSURE" in the case of ETRTO. When the tire is for a passenger vehicle, the normal internal pressure is 180 kPa.

As an especially preferable mode, a thickness of the tread rubber Tg is gradually reduced outward in the axial direction of the tire from the tire equator C, thereby preventing the rigidity of the belt layer 7 from being deteriorated. That is, if the thickness of the tread rubber Tg is equalized, the belt layer 7 is curved along the tread curve L with large curvature, and the lateral rigidity is prone to be deteriorated. Thus, in this embodiment, the thickness of the tread rubber Tg is controlled such that the following expressions (1), (2) and (3) are satisfied, thereby obtaining sufficient rigidity of the belt layer 7.

$$t1 > t2 > t3 \tag{1}$$

$$0.60 \times t1 \geq t3 \geq 0.10 \times t1 \tag{2}$$

$$t3 < 6.0 \tag{3}$$

wherein, t1 represents the thickness (mm) of the tread rubber Tg at the tire equator C, t3 represents a thickness (mm) of the tread rubber of the outer end 7e of the belt layer 7, and t 2 represents a thickness (mm) of an intermediate position between the outer end 7e of the belt layer 7 and the tire equator C. It is preferable that following expressions (2)' and (3)' are satisfied.

$$0.55 \times t1 \geq t3 \geq 0.15 \times t1 \tag{2'}$$

$$t3 < 5.5 \tag{3'}$$

In the run-flat tire 1, the side reinforcing rubber layer 9 is disposed in each of the sidewall portions 3.

The side reinforcing rubber layer 9 is disposed in the inner side of the carcass 6 in the axial direction of the tire. The side reinforcing rubber layer 9 has a substantially falcate cross section whose thickness is gradually reduced from a central portion 9A having the greatest thickness T toward an inner end 9i and an outer end 9o of the side reinforcing rubber layer 9 in the radial direction of the tire.

The greatest thickness T of the side reinforcing rubber layer 9 is not especially limited, but if the greatest thickness T is excessively small, sufficient reinforcing effect can not be obtained easily, and if the greatest thickness T is excessively large, the weight of the tire is increased. From such a view point, the lower limit value of the greatest thickness T is preferably 3 mm or more, and more preferably 4 mm or more. The upper limit value is 12 mm or less, and more preferably 10 mm or less.

It is preferable that the inner end 9i of the side reinforcing rubber layer 9 is on the inner side of the outer end 10T of the bead apex rubber 10 in the radial direction of the tire, and on the outer side of the bead core 5 in the radial direction of the tire. The outer end 9o of the side reinforcing rubber layer 9 is terminated on the inner side of the outer end 7e of the belt layer 7 in the axial direction of the tire. Such a side reinforcing rubber layer 9 can enhance the vertical rigidity of the tire in a wide region of the sidewall portion 3. At the same time, the ends 9o and 9i are located in regions having small distortion at the time of running, thereby enhancing the durability.

In this embodiment, it is preferable that the side reinforcing rubber layer 9 has rubber hardness (durometer A hardness) of 65° or more, 70° or more, and 74° or more. The upper limit thereof is 99° or 90°. If the rubber hardness of the side reinforcing rubber layer 9 is less than 65°, there is a tendency that the reinforcing effect of the sidewall portion 3 becomes small, and if the hardness exceeds 99°, there is a tendency that the riding comfort at the time of normal running is deteriorated.

Preferable rubbers to be used for the side reinforcing rubber layer 9 are diene-based rubbers, more concretely, natural rubber, isoprene rubber, styrene butadiene rubber, butadiene rubber, chloroprene rubber, and acrylonitrile butadiene rubber. One of them can be used or two or more of them may be blended. Rubber generating low heat is preferable to suppress heat at the time of run-flat running. More specifically, loss tangent tan δ is 0.03 to 0.08, more preferably 0.03 to 0.06. The loss tangent is measured using a viscoelasticity spectrometer "VES F-3 type", and at a temperature of 70° C., frequency of 10 Hz, initial extension distortion of 10% and single amplitude of 1%.

In the run-flat tire 1, a side reinforcing cord layer 11 comprising at least one (one in this embodiment) reinforcing cord ply 11A is disposed in each sidewall portion 3. Each side reinforcing cord layer 11 extends in the radial direction of the tire along the outer surface of the ply body 6a between an outer end 11o of the side reinforcing cord layer 11 in the radial direction of the tire and an inner end 11i of the side reinforcing cord layer 11 in the radial direction of the tire. Therefore, the left and right side reinforcing cord layers 11 and 11 are not connected to each other and are separated from each other in the tread portion 2.

At the time of run-flat running, a load applied is relatively small in a region where the belt layer 7 is disposed. Therefore, the left and right side reinforcing cord layers 11 and 11 which are separated in the tread portion 2 can suppress the increase in weight of the tire to the minimum level and to enhance the vertical rigidity of the tire without deteriorating the load-supporting ability at the time of run-flat running. The side reinforcing cord layer 11 can enhance the bending rigidity of the side portion of the tire with smaller weight as compared with a case in which the side reinforcing rubber layer 9 is increased in thickness or size.

At the time of run-flat running, mainly a tensile stress is applied to an outer surface of the side reinforcing rubber layer 9 in the axial direction of the tire, and the ply body 6a and the side reinforcing cord layer 11 which are adjacent to the outer surface of the side reinforcing rubber layer 9 cooperate with each other and largely enhance the tensile rigidity of the outer surface and a portion of the tire near the outer surface. As a result, it is possible, at the time of run-flat running, to reduce an amount of bending deformation of the side reinforcing rubber layer 9, and to suppresses distortion and heat generation at the sidewall portion 3.

The outer end 11o of the side reinforcing cord layer 11 is sandwiched between the ply body 6a and the belt layer 7. The position of the outer end 11o is sandwiched between the plies having large rigidity and thus, distortion is relatively small even at the time of run-flat running. Thus, the tire is prevented from being damaged from the outer end 11o, and the run-flat durability is enhanced.

If the outer end 11o of the side reinforcing cord layer 11 comes excessively close to the outer end 7e of the belt layer 7, separation is prone to be generated in the outer end 11o of the side reinforcing cord layer 11 by the compression distortion applied to the outer end 7e of the belt layer 7. If the outer end 11o of the side reinforcing cord layer 11 is excessively separated largely from the outer end 7e of the belt layer 7 inward in the axial direction of the tire, since most of the side reinforcing cord layers 11 are disposed below the belt layer where even if this portion is reinforced, so much effect can not be expected, the weight of the tire is increased in vain. From such a point of view, it is preferable that a length AL of the superposed portion where the side reinforcing cord layer 11 and the belt layer 7 are superposed on each other is 5 mm or more, 10 mm or more and more preferably 15 mm or more. It is preferable that the upper limit is 40 mm or less, 30 mm or less and more preferably 25 mm or less.

The inner end 11i of the side reinforcing cord layer 11 in the radial direction is terminated between the ply body 6a and the bead apex rubber 10 and at a location near the bead core 5. Since the distortion at the time of running under load is relatively small in this location, damage such as separation from the inner end 11i of the side reinforcing cord layer 11 is prevented, and the durability of the tire 1 is enhanced.

Here, "in the vicinity of the bead core 5" means an area with a distance S from the outer surface of the bead core 5 in the radial direction of the tire being not more than 20 mm.

If the inner end 11i of the side reinforcing cord layer 11 comes close to the outer end 10T of the bead apex rubber 10, distortion is prone to be concentrated on this portion. From such a point of view, it is preferable that a length RL of the superposed portion where the bead apex rubber 10 and the side reinforcing cord layer 11 are superposed on each other in the radial direction of the tire is 5 mm or more, 10 mm or more and more preferably 15 mm or more. The upper limit is preferably 40 mm or less, and more preferably 30 mm or less in terms of tire weight.

Figure 3:
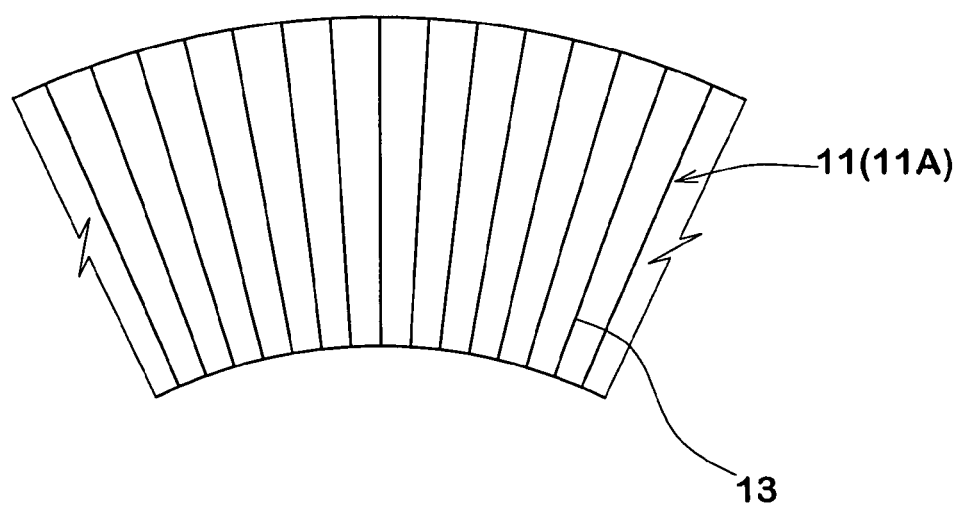
FIG. 3 is a development view as viewed from a side surface of a side reinforcing cord layer.

FIG. 3 shows one example of a partial side view of the side reinforcing cord layer 11 as viewed from its outer surface in perspective manner. In this embodiment, the reinforcing cord ply 11A of the side reinforcing cord layer 11 includes a reinforcing cord 13 extending in the radial direction. The radial direction is a direction of radiation extending from a rotation axis of the tire. Such a reinforcing cord 13 suppresses the distortion at the time of running under load to a small level like the carcass ply 6A of the radial structure, and suppresses heat of the topping rubber which coats the cord, and enhances the anti-fatigue level.

Preferable examples of materials of the reinforcing cord 13 of the reinforcing cord ply 11A are organic fiber cords having small specific gravity and excellent adhesive, especially organic fiber such as aramid, nylon, polyester, rayon, polyethylene-2, and 6-naphthalete (PEN).

As one example, the same cord material (polyester cord in this embodiment) as that of the carcass cord can be used as the reinforcing cord 13. Further, the same cord ply materials can be used for the reinforcing cord ply 11A and the carcass ply 6A. In this case, since the carcass ply 6A and the side reinforcing cord layer 11 can use the same cord materials or carcass ply materials, the run-flat tire 1 can be reinforced with lower costs.

As another embodiment, it is possible to use a cord having greater modulus than that of the carcass cord and having excellent heat resistance as the reinforcing cord 13. When the carcass cord is made of polyester cord, preferable materials for the reinforcing cord 13 are aramid cord, polyethylene-2, and 6-naphthalete (PEN). The magnitude of the modulus of the cord is compared with magnitude of modulus at the time of expansion of 2% at 20° C. The heat resistance is compared with magnitude of modulus at the time of expansion of 2% at 150° C., and greater one of them has higher heat resistance.

The side reinforcing cord layer 11 smoothly extends between the outer end 11o and the inner end 11i along the outer surface of the ply body 6a in the axial direction of the tire such as to draw a smooth arc. An inner portion of the side reinforcing cord layer 11 in the radial direction of the tire can extend along the outer surface of the bead apex rubber 10. In this case, however, since compression distortion is easily applied to the cord layer 11, the reinforcing effect is deteriorated.

Figure 4:
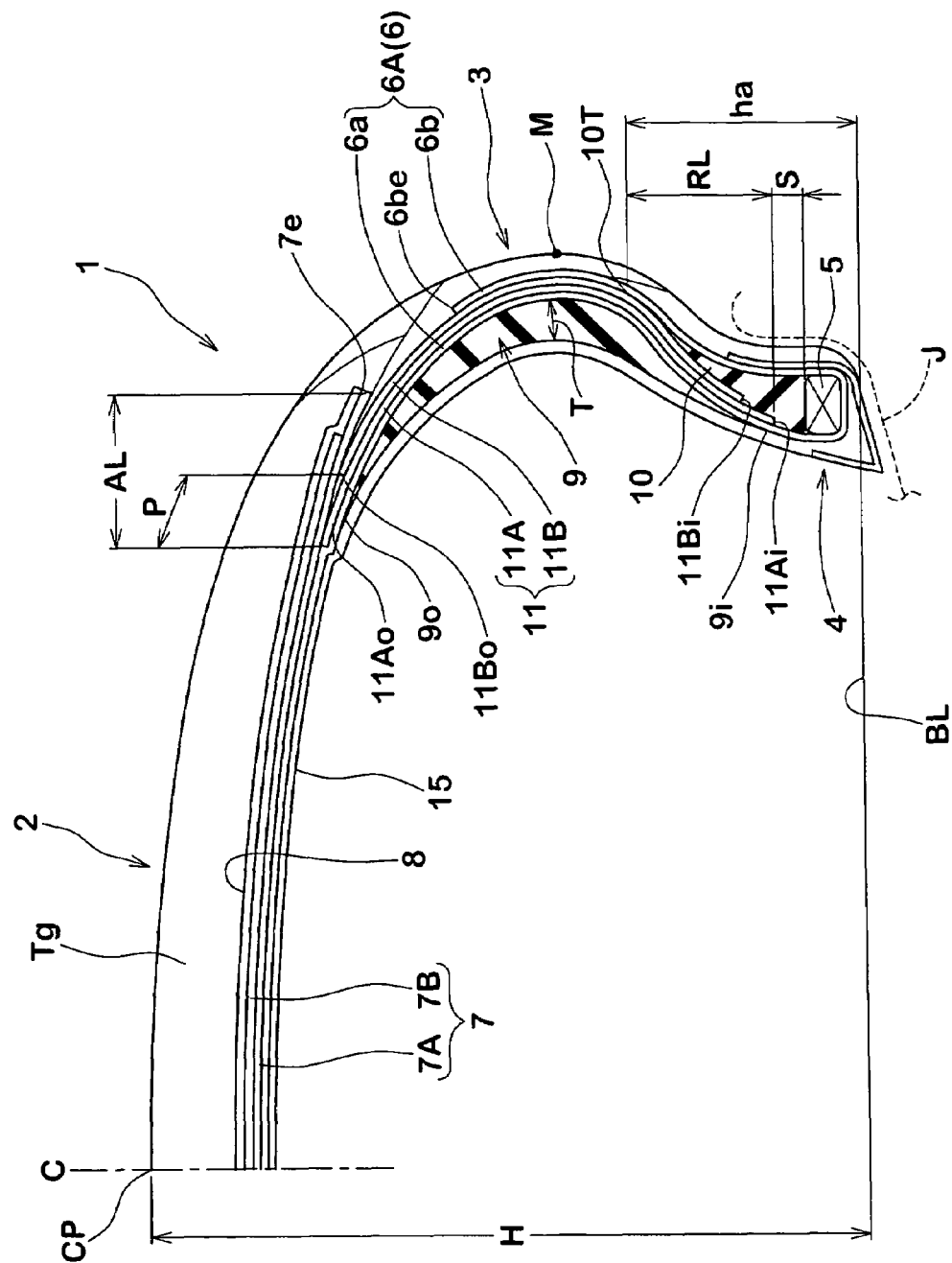
FIG. 4 is a sectional view of a run-flat tire showing another embodiment of the invention.
Figure 5:
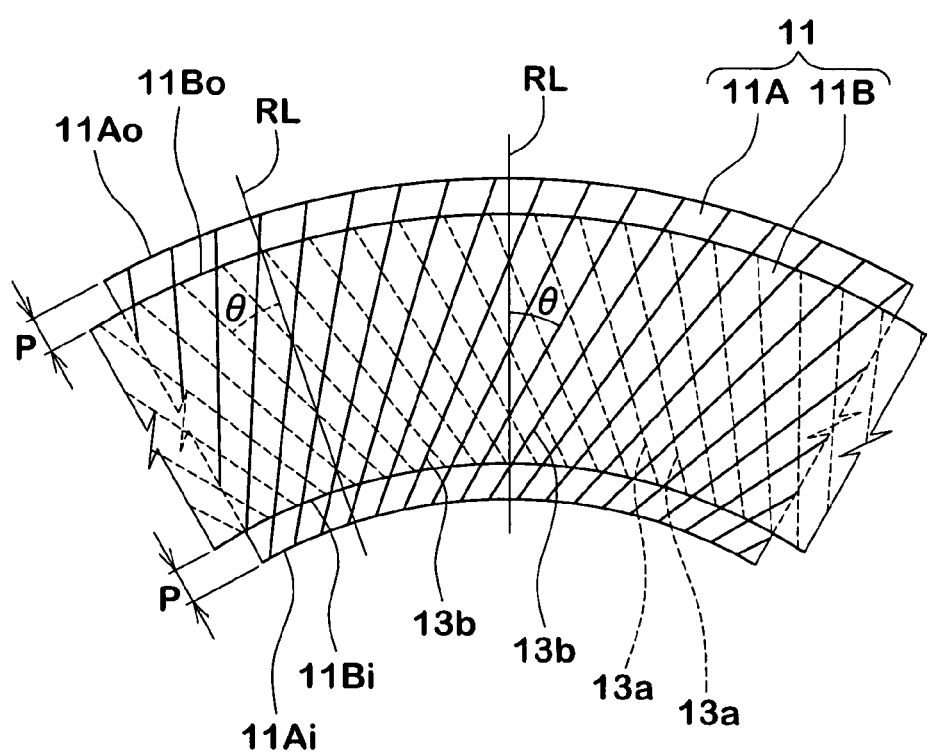
FIG. 5 is a development view as viewed from a side surface of a side reinforcing cord layer.

FIGS. 4 and 5 show another embodiment of the present invention. FIG. 4 is a sectional view of a right half of a normal state of the tire, and FIG. 5 is a partial side view of the side reinforcing cord layer 11 as viewed from the side.

In the run-flat tire 1 of this embodiment, the side reinforcing cord layer 11 comprises a plurality of (two, in this embodiment) cord plies 11A and 11B. Reinforcing cords 13a and 13b of the reinforcing cord plies 11A and 11B are inclined with respect to a reference line RL in the radial direction, and the reinforcing cords 13a and 13b intersect with each other between the reinforcing cord plies 11A and 11B. That is, the side reinforcing cord layer 11 has a so-called cross ply structure, maintains rigidity of the sidewall portion 3 at high level, and enhances the steering stability. With this, the side reinforcing rubber layer 9 can be reduced in thickness, and the maximum thickness T can largely be reduced.

An angle θ of the reinforcing cords 13a and 13b with respect to the radial direction is not especially limited, but preferable angle is 35° and more, 45° or more, and a preferable upper limit is 70° or less, and 60° or less. If the angle θ becomes smaller than 35° or 70° or more, the side reinforcing effect is deteriorated, and the run-flat performance is deteriorated. The angle θ is measured as substantially intermediate position of the reference line RL in the radial direction of the tire.

The inner ends 11Ai and 11Bi and/or outer ends 11Ao and 11Bo of the reinforcing cord plies 11A and 11B in the radial direction of the tire are deviated from each other in position. With this, it is possible to prevent rigidity from being largely varied. As shown in FIG. 5, a preferable length P of positional deviation in the radial direction along the ply is 5 to 20 mm, more preferably 8 to 15 mm.

In this embodiment, the outer end 11o of the side reinforcing cord layer 11 and the outer end 9o of the side reinforcing rubber layer 9 are separated from each other in the axial direction of the tire. Similarly, the inner end 11i of the side reinforcing cord layer 11 and the inner end 9i of the side reinforcing rubber layer 9 are separated from each other in the axial direction of the tire. With this, it is possible to effectively prevent distortion from being concentrated on the ends.

In the side reinforcing cord layer 11 shown in FIG. 4, the inner cord ply 11A disposed inside in the axial direction of the tire and the outer cord ply 11B disposed outside may be made of different cord materials. It is effective if the modulus of the cord of the outer cord ply 11B disposed further from a bending neutral line of the side reinforcing rubber layer 9 is greater than that of the inner cord ply 11A. For example, the inner ply 11A may be made of rayon cord, and the outer ply 11B may be made of aramid cord.

As explained above, according to the run-flat tire 1 of the embodiment, it is possible to reduce the weight of the tire and to increase the run-flat running distance. In the embodiment, the explanation is based on the tire for a passenger vehicle, but the present invention is not limited to the embodiment, and the invention can also be applied to other kinds of tires of course.

EXAMPLES

Run-flat tires of 245/45R18 were prototyped based on specification shown in Table 1, and the run-flat running distance and the tire weights were tested. In each tire, the belt layer comprising two belt plies comprising steel cord, belt layer of one ply comprising aramid cord, and carcass ply using polyester cord had a common specification. The side reinforcing rubber layer has the same disposition region in the radial direction of the tire and the rubber composition (JIS durometer A hardness: 78°), and a portion of the maximum thickness T was varied. The height ha of the bead apex rubber was set to 35 mm.

The tire of the example was a run-flat tire having the basic structure shown in FIGS. 1 and 4. As comparison, tires having the following structures were also tested.

Comparative Example 1

Figure 6:
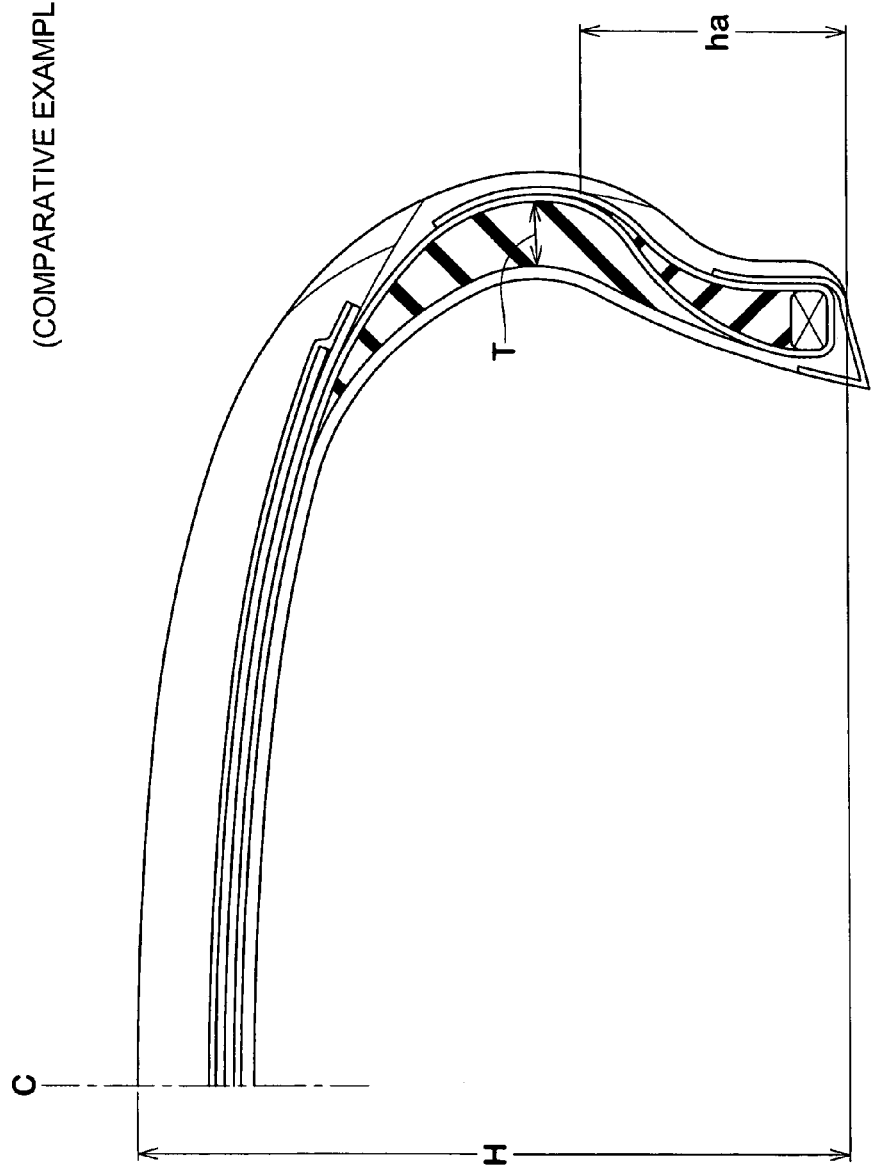
FIG. 6 is a sectional view of a run-flat tire of comparative example 1.

As shown in FIG. 6, the comparative example 1 is different from the example only in that the side reinforcing cord layer is eliminated from the run-flat tire shown in FIG. 1, and other portions of the comparative example 1 are the same as those of the tire shown in FIG. 1.

Comparative Example 2

Figure 7:
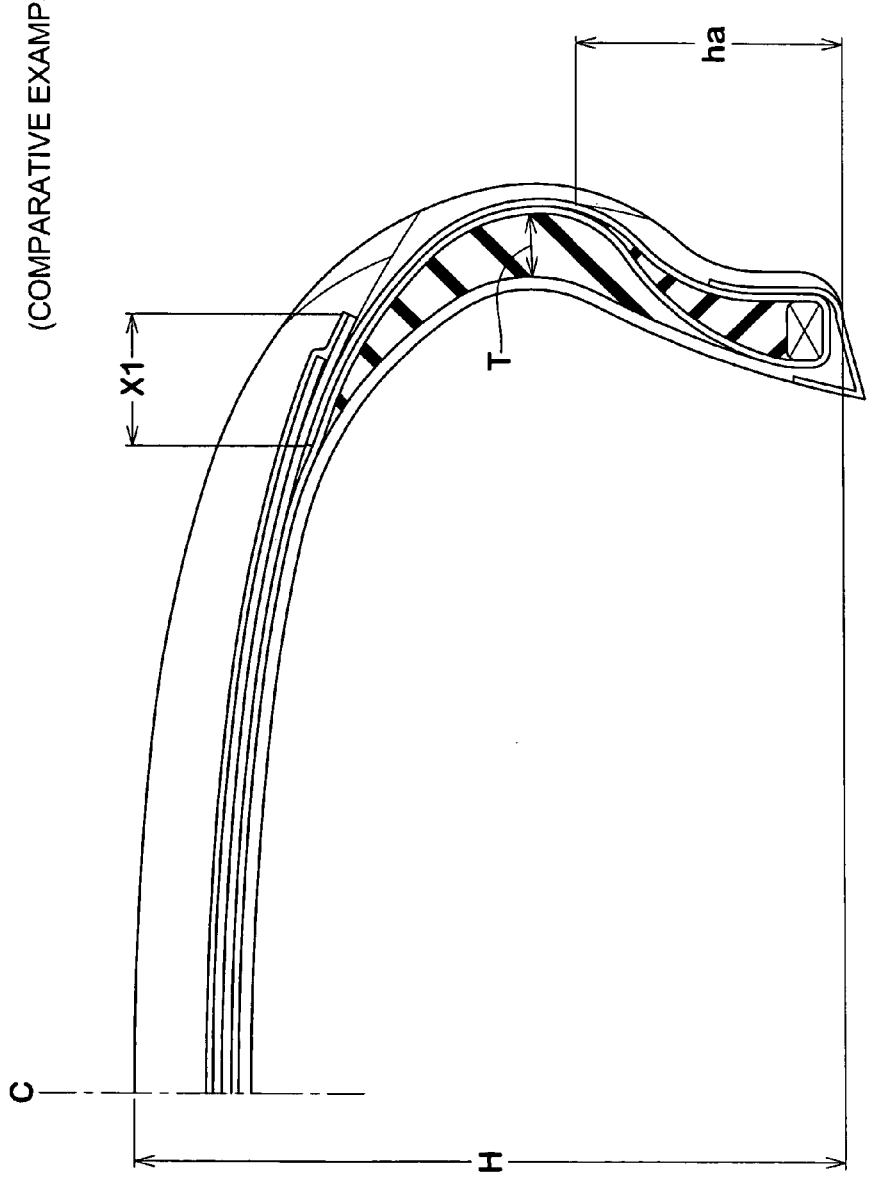
FIG. 7 is a development view of a run-flat tire of comparative example 2.

The comparative example 2 has the same structure as that of the comparative example 1 as shown in FIG. 7, but the comparative example 2 is a run-flat tire in which the folded-back portion of the folded-back ply is extended to an inner side of the belt layer in the radial direction of the tire. A superposed length shown in the drawing is 20 mm. A side reinforcing cord layer is not provided. Other structures are the same as those shown in FIG. 1.

Comparative Example 3

The tire of the comparative example 3 is a run-flat tire in which one folded-back ply is added to the structure of the comparative example 1 as shown in FIG. 8. The folded-back height Y1 of the added folded-back ply is 20 mm.

Comparative Example 4

The tire of the comparative example 4 is a run-flat tire in which a flipper FP is added to the structure (FIG. 6) of the comparative example 1. The specification of the flipper FP is as follows:

Cord material: aramid
Cord angle: 45°
The number of strikes: 35 strikes/5 cm
Height Y2: 15 mm
Height Y3: 30 mm

Comparative Example 5

The tire of the comparative example 4 is a run-flat tire in which a flipper FP is added to the structure (FIG. 6) of the comparative example 1. The specification of the flipper FP is as follows:

Cord material: aramid
Cord angle: 45° parative example 1 was set to 100. The higher numerical value shows more excellent result.

<Tire Weight>

The weight per one tire was measured, and the result is shown with index in which a value of the comparative example 1 is set to 100. The lower numerical value shows lighter weight. Test results are shown in Table 1.

TABLE 1

|  |  | Comparative example 1 | Comparative example 2 | Comparative example 3 | Comparative example 4 | Comparative example 5 | Example 1 | Example 2 | Example 3 | Example 4 | Example 5 | Example 6 |
|---|---|---|---|---|---|---|---|---|---|---|---|---|
| Basic structure diagram of tire* | | FIG. 6 (HTU) | FIG. 7 (HTU) | FIG. 8 (HTU) | FIG. 9 (HTU) | FIG. 10 (HTU) | FIG. 1 (HTU) | FIG. 1 (LTU) | FIG. 1 (HTU) | FIG. 1 (HTU) | FIG. 1 (HTU) | FIG. 1 (HTU) |
| Maximum thickness T of side reinforcing rubber layer [mm] | | 7 | 7 | 7 | 7 | 7 | 7 | 7 | 7 | 7 | 7 | 6 |
| Side reinforcing cord layer | Cord material | — | — | — | — | — | Polyester | Polyester | Rayon | Rayon | Rayon | Rayon |
| | The number of cord plies | — | — | — | — | — | 1 | 1 | 1 | 1 | 1 | 1 |
| | Cord angle θ [°] | — | — | — | — | — | 90 | 90 | 90 | 90 | 90 | 90 |
| | Superposed length Al [mm] | — | — | — | — | — | 20 | 20 | 20 | 15 | 15 | 20 |
| | Superposed length Rl [mm] | — | — | — | — | — | 25 | 25 | 25 | 15 | 25 | 25 |
| Test results | Run-flat running distance [index] | 100 | 115 | 130 | 108 | 105 | 125 | 110 | 135 | 125 | 130 | 110 |
| | Tire weight [index] | 100 | 102 | 108 | 101 | 101 | 104 | 101 | 104 | 103 | 103 | 100 |

|  |  | Example 7 | Example 8 | Example 9 | Example 10 | Example 11 | Example 12 | Example 13 | Example 14 | Example 15 | Example 16 | Example 17 | Example 18 |
|---|---|---|---|---|---|---|---|---|---|---|---|---|---|
| Basic structure diagram of tire* | | FIG. 1 (LTU) | FIG. 1 (HTU) | FIG. 1 (HTU) | FIG. 1 (HTU) | FIG. 1 (HTU) | FIG. 1 (HTU) | FIG. 1 (LTU) | FIG. 4 (HTU) | FIG. 4 (LTU) | FIG. 4 (HTU) | FIG. 4 (LTU) | FIG. 4 (LTU) |
| Maximum thickness T of side reinforcing rubber layer [mm] | | 7 | 7 | 7 | 7 | 6 | 5 | 7 | 6 | 6 | 6 | 6 | 6 |
| Side reinforcing cord layer | Cord material | Rayon | Aramid | Aramid | Aramid | Aramid | Aramid | Aramid | Rayon | Rayon | Aramid | Aramid | Inside: Aramid Outside: Rayon |
| | The number of cord plies | 1 | 1 | 1 | 1 | 1 | 1 | 1 | 2 | 2 | 2 | 2 | 2 |
| | Cord angle θ [°] | 90 | 90 | 90 | 90 | 90 | 90 | 90 | 50 | 50 | 50 | 50 | 50 |
| | Superposed length AL [mm] | 20 | 20 | 15 | 15 | 20 | 20 | 20 | 20 | 20 | 20 | 20 | 20 |
| | Superposed length RL [mm] | 25 | 25 | 15 | 25 | 25 | 25 | 25 | 25 | 25 | 25 | 25 | 25 |
| Test results | Run-flat running distance [index] | 120 | 170 | 150 | 165 | 140 | 100 | 150 | 130 | 115 | 160 | 140 | 130 |
| | Tire weight [index] | 101 | 104 | 103 | 103 | 100 | 96 | 101 | 103 | 101 | 103 | 101 | 101 |

*HTU: High turn up structure
LTU: Low turn up structure (ply structure in which outer end of a folded-back portion of folded-back ply is provided on an inner side from an outer end of a rim flange of a normal rim in a radial direction)

The number of strikes: 35 strikes/5 cm
Height Y2: 12 mm
Height Y3: 45 mm
The test method is as follows:

<Run-Flat Running Distance>

Each prototyped tire was assembled to a rim (18×8J) from which a valve core was removed, and a tire assembly in which an internal pressure was se to zero was prepared. Each assembly was allowed to run on a drum tester, and the running distance through which the tire could run until the tire was destroyed was measured. In this running test, the speed was 90 km/h, and the vertical load was 4.9 kN. The evaluation is shown with index in which the running distance of the com-

What is claimed is:

1. A run-flat tire comprising:
   a carcass including at least one carcass ply having a ply body extending from a tread portion to a bead core of a bead portion through a sidewall portion, and a ply folded-back portion which is connected to the ply body and which is folded back from inside toward outside around the bead core in an axial direction of the tire;
   a belt layer disposed outside of the carcass in a radial direction of the tire and inside of the tread portion;
   a side reinforcing rubber layer which is disposed axially inward of the carcass ply body in the sidewall portion and which has a substantially falcate cross section;

a side reinforcing cord layer comprising two reinforcing cord plies overlapping each other and disposed in the sidewall portion, in which reinforcing cords are arranged at an angle of 35° to 70° with respect to the radial direction so that the reinforcing cords in one ply intersect with reinforcing cords in the other ply, and a bead apex rubber which is tapered and toward radially outward from an outer surface of the bead core and is disposed in the bead portion between the carcass ply body and the carcass ply folded-back portion, wherein the side reinforcing cord layer extends in the radial direction in contact with the axially outer surface of the ply body, and passes between the ply body and the bead apex rubber, an outer end of the side reinforcing cord layer in the radial direction is sandwiched and terminated between the ply body and the belt layer, and an inner end of the side reinforcing cord layer in the radial direction is terminated in the vicinity of the bead core.

2. The run-flat tire according to claim 1, wherein a length of a superposed portion in the axial direction of the tire where the side reinforcing cord layer and the belt layer are superposed on each other is in a range of 5 to 40 mm.

3. The run-flat tire according to claim 1, wherein the length RL of an overlapping portion in the radial direction of the tire where the bead apex rubber and the side reinforcing cord layer overlap on each other is in a range of 5 to 40 mm.

4. The run-flat tire according to claim 1, wherein a reinforcing cord of the side reinforcing cord layer comprises the same cord as a carcass cord of the carcass ply.

5. The run-flat tire according to claim 1, wherein the reinforcing cord of the side reinforcing cord layer has a greater modulus and a higher heat resistance than those of the carcass cord of the carcass ply.

6. The run-flat tire according to claim 1, wherein the side reinforcing cord layer is formed of a reinforcing cord ply comprising reinforcing cords arranged along the radial direction.

7. The run-flat tire according to claim 1, wherein the maximum thickness of the side reinforcing rubber layer is in a range of 3 to 12 mm.

8. The run-flat tire according to claim 1, wherein a loss tangent (tan $\delta$) of the side reinforcing rubber layer is in a range of 0.03 to 0.08.

9. The run-flat tire according to claim 1, wherein the radially outer end of the ply folded-back portion is located inward of the radially outer end of a flange of a normal rim.

10. The run-flat tire according to claim 1, wherein the radially outer end of the ply folded-back portion is located radially outward of the widest position M of the tire.

* * * * *

UNITED STATES PATENT AND TRADEMARK OFFICE
CERTIFICATE OF CORRECTION

| | |
|---|---|
| PATENT NO. | : 7,650,921 B2 |
| APPLICATION NO. | : 11/360684 |
| DATED | : January 26, 2010 |
| INVENTOR(S) | : Masatoshi Tanaka |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 592 days.

Signed and Sealed this

Twenty-third Day of November, 2010

David J. Kappos
*Director of the United States Patent and Trademark Office*